W. C. OSTERHOLM.
GRINDING MACHINE.
APPLICATION FILED NOV. 20, 1915.

1,230,595.

Patented June 19, 1917.
6 SHEETS—SHEET 5.

UNITED STATES PATENT OFFICE.

WILLIAM C. OSTERHOLM, OF CHICAGO, ILLINOIS, ASSIGNOR TO INTERNATIONAL HARVESTER COMPANY OF NEW JERSEY, A CORPORATION OF NEW JERSEY.

GRINDING-MACHINE.

1,230,595.   Specification of Letters Patent.   Patented June 19, 1917.

Application filed November 20, 1915. Serial No. 62,459.

*To all whom it may concern:*

Be it known that I, WILLIAM C. OSTERHOLM, a citizen of the United States, residing at Chicago, in the county of Cook and State of Illinois, have invented certain new and useful Improvements in Grinding-Machines, of which the following is a full, clear, and exact specification.

My invention relates to grinding machines in general, and is adapted in particular for beveling the edges of sickle sections for harvesting and mowing machines.

The object of the invention is to improve and simplify grinding machines whereby operations thereof are automatic; for example, automatic in the action of grinding the applied blanks to a cutting edge by passing them in opposite directions across the face of a rapidly rotating ring stone and progressively advancing the blanks in the direction of the stone by accurately graduated steps at each pass as the beveled edges are caused to assume a finished form; to provide micrometer mechanism for adjusting the head, into which the stone carrying spindle is journaled, toward the blank carrying head; to provide an automatically operative blank receiving and clamping head having connection with a source of cooling water supply whereby the flow of water to the head is controlled in an intermittent manner determined by the movement of the head from an inoperative to an operative position, and to direct the flow of water from the head upon the blank and stone in a manner to prevent undue heating of the blank during the grinding operation, and to operate as a blank releasing element as the head recedes to its initial and inoperative position.

These objects are attained by means of the mechanism illustrated in the accompanying drawings, in which—

Fig. 10 is a vertical section of the blank carrying head and a part of the cooling water supply mechanism;

Referring to the drawings, wherein the same reference numerals designate like parts throughout the several views, 1 represents the main frame of the machine, having side walls 2, a front end wall 3, and base members 4 whereby it may be secured to the floor. The upper wall of the frame includes longitudinally disposed angular ways 5 upon opposite sides of its longitudinal center, upon which is slidably mounted a head member 6, having journal bearings 7, in which is journaled a spindle 8 provided with a stone receiving member $8^1$ on its front end, in which is mounted an abrasive stone 9 having a ring form, and 10 represents a driving pulley secured to the shaft. Means are provided for adjusting the head longitudinally upon the frame including a shaft 11, having one end threaded into the head and secured by means of a locking nut 12. 13 represents a forwardly extending bracket member secured to the front wall of the main frame, to the front end of which is secured a cup-shaped bearing member 14, in which is journaled a threaded sleeve 15, having a flange 16 upon its rear end that is received by a counterbore in the member 14, and $16^1$ represents a collar secured to the bearing member by means of cap screws 17 and operative to prevent a longitudinal movement of the sleeve within the bearing member. The shaft 11 is threaded throughout the greater part of its length and receives the sleeve 15, and 18 represents a non-corrosive tube having its rear end secured to the shaft by means of a pin 19, and its front end telescopically received by the rear end of a similar tube having its front end received by an axial opening in the collar member 16¹, the tube operating to shield the shaft in any position of its adjustment.

Secured to the sleeve 15 is a toothed wheel 20, upon the hub of which is journaled a casing 21 that incloses the wheel, and 22 represents a bearing sleeve threaded upon the front end of the sleeve 15, upon which is rotatably mounted the hub member 23 of a hand lever 24, having a concentric web member 25 whereby the lever is secured to the casing 21. 26 represents a rocking detent arm pivotally mounted upon the lever 24 by means of a pivot pin 27, having a rearwardly extending arm 28 adapted to engage with the toothed rim of the wheel 20, and a heel member 29 that engages with a spring-pressed plunger 30 whereby the arm 28 is caused to normally engage with the teeth upon the rim of the wheel. 31 represents a forwardly extending tubular hand piece integrally connected with the free end of the lever, and pivoted therein is a thumb controlled lever 32 that is operatively connected with the detent 26 by means of a link 33.

34 represents a barrel member carried by the casing 21, and 31¹ a spring-pressed detent received by the barrel and adapted to engage with radially disposed ribs 36 integral with the bearing member 14 in a manner to limit an angular movement of the hand lever in opposite directions, it being provided with a head 37 at its front end whereby it may be drawn forward to disengage it from the limiting ribs when it is desired to permit a greater angular movement of the hand lever and its associated parts.

The stone adjusting mechanism as described operates as a ratchet adjustment upon the sleeve 15 and controls a longitudinal movement of the shaft 11 in opposite directions in an accurate and measured throw manner.

38 represents a longitudinally disposed bearing sleeve preferably integral with the base of the main frame 1 of the machine, and extending beyond the front wall thereof receives a bushing 39 at its front end and a similar bushing 40 at its rear end, and 41 represents a hollow rockable cylinder journaled therein and provided with a flanged head 42 that overlaps the front end of the bushing 39 and bearing sleeve 38. Secured to the flanged head 42 of the cylinder, by means of bolts 43, is a radially disposed arm 44, having forwardly extending parallel ribs 45 upon its opposite sides that terminate at their upper ends in inwardly extending boss members 46, in which is journaled a rock shaft 47. Secured to the rock shaft is a blank carrying head 48 including a forwardly extending arm 49, to which is pivotally connected a yoke member 50 by means of a pin 51, the yoke being provided with upwardly and forwardly extending arms 52 carrying at their free ends an adjustable contact screw 53. The blank carrying head 48 is provided with a cylindrical transversely disposed water receiving chamber 54, having elongated outlet ports 55 in its rear wall and communicating with a source of water supply under pressure by means of valve hose mechanism including a faucet member 56, and having a threaded shank 57 secured in an opening through one of the end walls of the chamber 54 and a barrel member 58 that operatively receives a valve 59 provided with a stem 60 slidably received by an opening in the wall of the faucet member. The valve is normally held closed by means of a compression spring 61, having one end received by a hollow extension 62 of the valve, and its opposite end engaging with a removable end wall 63 of the faucet member. 64 represents a laterally extending hollow branch integral with the faucet member and provided with a series of ports 65 through its side walls that communicate with an annular chamber 66 in the head 67 that is rotatably mounted upon the branch 64 and provided with a hollow stem 68 whereby a hose 69 may connect the head with a source of water supply, and 70 represents a stuffing box member screw threaded into the end of the branch and yieldingly pressing the head longitudinally thereon by means of an inclosed compression spring 71.

Figure 11:
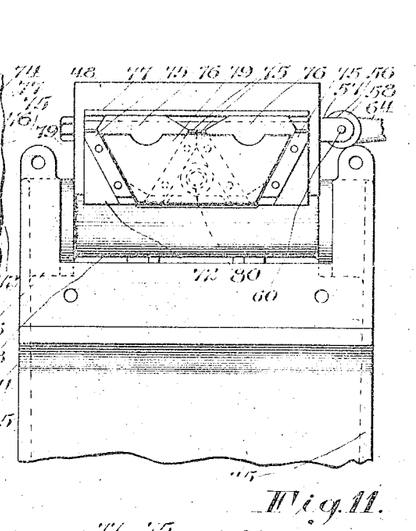
Fig. 11 is a rear elevation of the blank carrying head.
Figure 12:
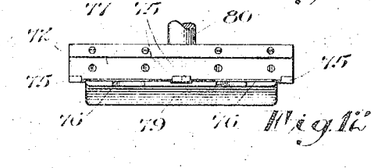
Fig. 12 is a top view of a part of Fig. 11.
Figure 13:
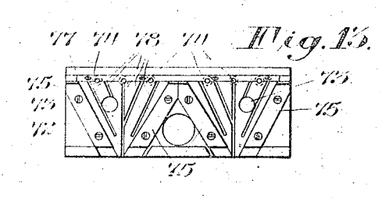
Fig. 13 is a face view of part of the blank holding means as shown in Fig. 11.

72 represents a blank carrying block secured to the rear side of the head 48 by means of cap screws 73 and provided with openings 74 communicating with the outlet ports 55 of the chamber 54. The rear blank receiving face of the block 72 is inclined downward and forward, having a degree of inclination that is desired to give a chosen degree of bevel to the cutting edge of the finished sections, and 75 represents angularly disposed stop members secured to the block and adapted to properly position the blanks as they are placed thereon by the operator, as shown in Fig. 11. The head is adapted to receive two blanks 76 that are transposed from one side thereof to the other to complete the grinding operation of both edges of the section, and 77 represents a transversely disposed hardened steel plate secured to the upper side of the block and operative as a backing member to the edges of the blank. The block 72 is provided with a series of grooves 78 leading from the openings 74 and converging toward the center of the receptacles for the blanks. 79 represents a slidable jaw provided with an angular face conforming to the angular position of the stop members 75 and adapted to engage the blanks and secure them against movement during the grinding operation. The clamping movement of the jaw is controlled by means including a forwardly extending stud 80, integral with the block and its body portion slidably received by an opening 81 through the center of the head 48, and 82 represents a shell nut threaded upon the opposite end of the stud and receiving one end of a compression spring 83 that is operative between the head and shell in a manner to normally move the block 72 toward the head, and 84 represents a securing nut threaded upon the free end of the stud and adapted to engage with the contact screw 53 carried by the arms 52 when the head is rocked to a blank receiving position.

The lower ends of the ribs 45 terminate in bosses 85, in which is secured a transverse shaft 86, and rockably mounted upon the shaft is a toggle yoke 87, having vertically disposed arms 88, in which is secured a shaft 89 having the forked arms 90 of a toggle member 91 pivotally mounted thereon and including a threaded socket member 92 that operatively receives the lower threaded end of a rod 93, and 94 is a securing nut. The opposite end of the rod is threaded in a reverse way, and is received by a depending socket member 95 integral with the yoke 50, and 96 is a securing nut. 97 represents a coupling member mounted upon the shaft 89 between the arms 90 and provided with a depending lug 98 that engages with the end of a screw 99 that is adjustably mounted upon the toggle yoke 87 and operative to limit the throw of the toggle members in a forward direction. 100 represents a rearwardly extending threaded socket member that is integral with the coupling member 97 and receives the threaded end of a rod 101, and 102 is a securing nut.

Figure 1:
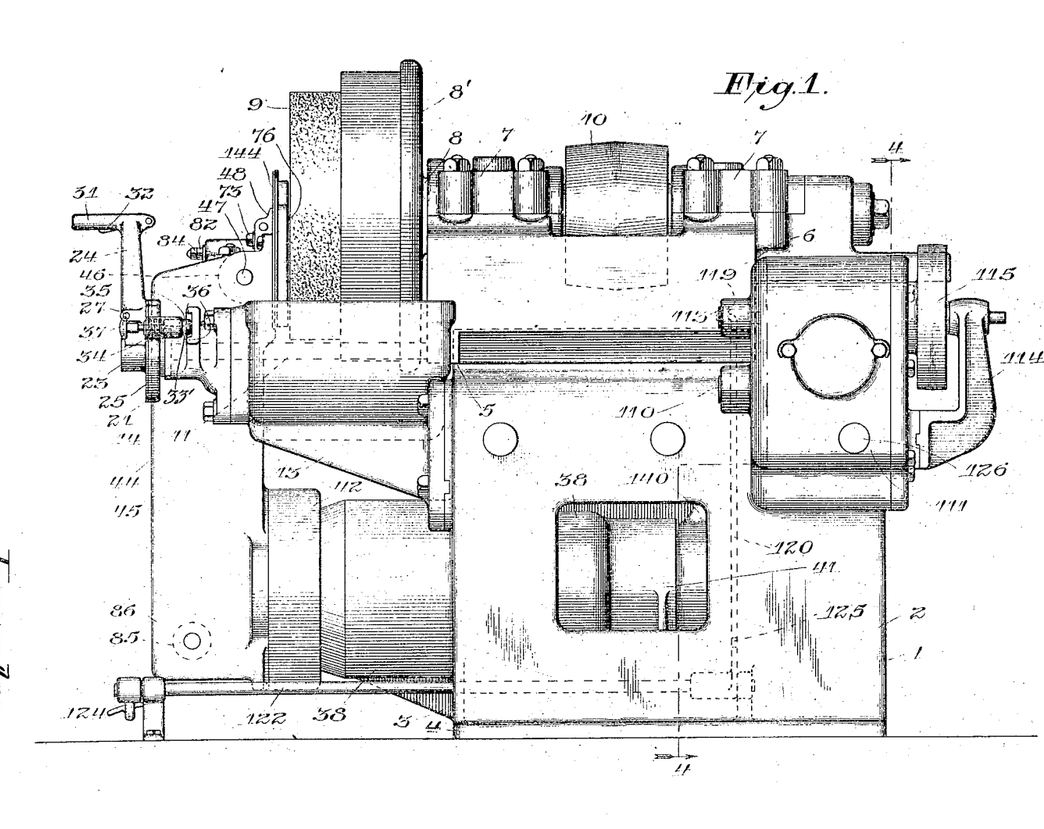
Figure 1 is a side elevation of a grinding machine embodying my invention.
Figure 2:
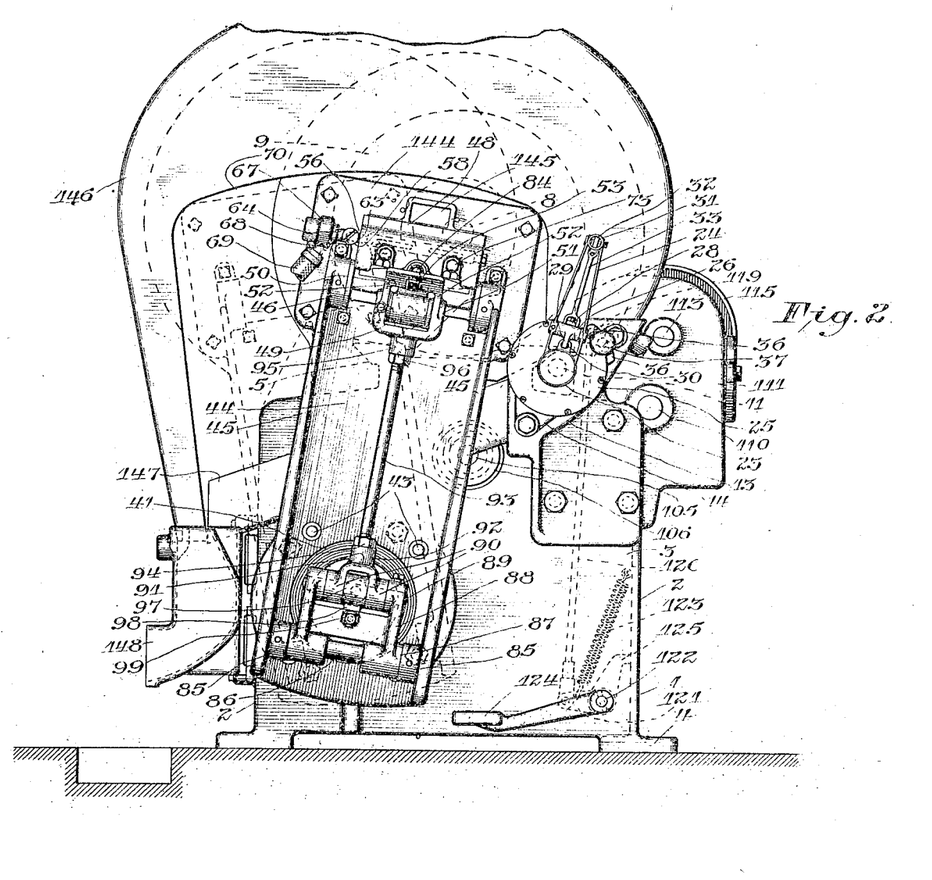
Fig. 2 is a front elevation of Fig. 1.
Figure 3:
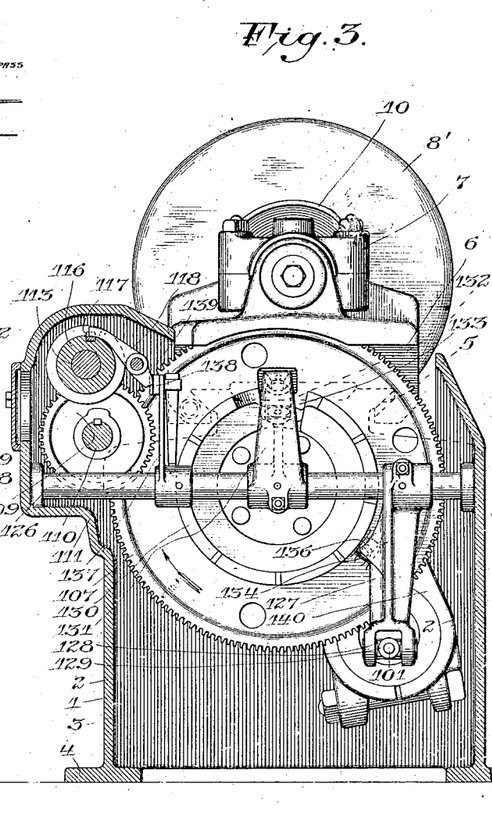
Fig. 3 is a rear end elevation, partly in section, of Fig. 1.
Figure 4:
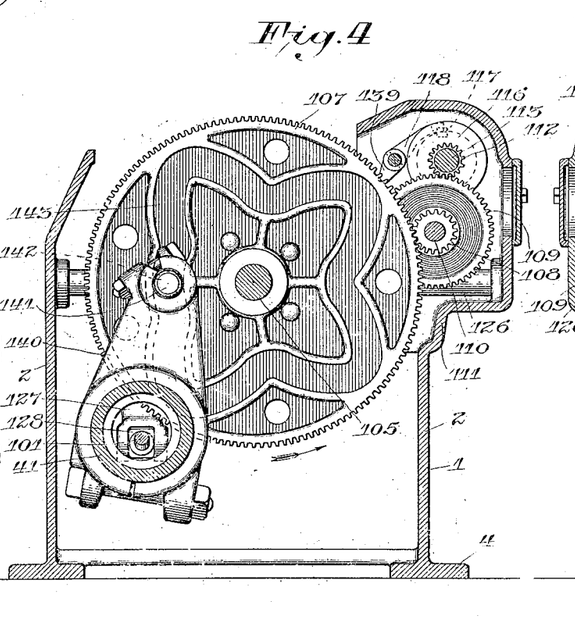
Fig. 4 is a reversed sectional elevation of part of Fig. 3, taken in the plane of line 4—4 of Fig. 1, designed to illustrate the construction of the cam mechanism for controlling the vibratory movement of the blank carrying head across the stone.

103 represents a longitudinally disposed bearing member integral with the main frame 1, and provided with bronze bushings 104 at its opposite ends, in which is journaled a shaft 105, having secured to its front end a cap 106 and to its opposite end a spur gear wheel 107 meshing with a pinion 108 integral with the spur gear wheel 109 secured to a shaft 110 journaled in bearings carried by a casing 111 forming part of the main frame 1, the gear 109 meshing with a pinion 112 journaled upon a shaft 113 that has its front end journaled in the frame of the machine and its rear end in an arm 114 secured to the frame, and secured to the shaft is a driving pulley 115. The pinion 112 rotates with a clutch sleeve 116 carrying a longitudinally movable clutch dog 117 that is controlled by a clutch shipping lever 118 in the same manner as is shown in Figs. 10 and 11 of my Patent No. 1,042,259, issued October 22, 1912, the lever being provided with an arm 119 shown by dotted lines in Fig. 2, whereby it is operatively connected with the upper end of a link 120, the lower end of the link being adjustably connected with an arm 121 secured to the rear end of a rock shaft 122 journaled in the main frame. A tension spring 123 connects the arm with the frame in a manner to rock the shaft in a direction to cause the lever 118 to move to a clutch disengaging position, and a foot lever 124 is secured to the opposite end of the shaft whereby the operator may trip the clutch into action, and 125 represents a stop member carried by the shaft and engaging with the frame in a manner to limit a rocking movement of the shaft under tension of the spring 123.

Journaled in bearings carried by the rear end of the frame of the machine, in the plane of the axis of the shaft 105, is a transversely disposed rock shaft 126 having an arm 127 secured thereto, upon the free end of which is journaled a coupling member 128, into which is threaded the rear end of the rod 101, and 129 represents a securing nut. Secured to the spur gear wheel 107 is a face cam member 130. 131 represents a vertically disposed arm secured to the rock shaft 126, and 132 a roller journaled upon the free end of the arm and adapted to engage with the face cam member 130 when the wheel 107 is rotated and to move into a gap 133 in the cam member at the end of each rotation of the wheel, the shaft 126 being rocked in a direction to cause the roller to enter the gap by means of a roller 134 journaled upon a radially disposed pin 135 carried by the wheel 107 and engage with a cam track 136 integral with the arm 127. Secured to the rock shaft 126 is a vertically disposed arm 137, carrying at its free end a cam 138 that engages with a heel 139 forming part of the clutch shipping lever 118 in a manner to hold the lever out of engagement with the clutch dog 117 when the roller 132 is riding upon the cam member 130 and to permit it to engage therewith when the roller enters the gap 133, whereby one complete revolution is imparted to the cam at each actuation of the clutch mechanism.

Secured to the rear end of the hollow rockable cylinder 41 is an arm 140 carrying a stud 141, upon which is journaled a roller 142 that traverses a multiple cam 143 mounted upon the front face of the spur gear wheel 107, whereby a rocking movement is imparted to the cylinder 41 and a vibrating movement to the arm 44 carrying the blank holding mechanism toward and from the axis of the grinding stone. The cam races upon the wheel 107 are so disposed and proportioned as to cause eight passes of the blank carrying head across the face of the grinding stone at each revolution of the wheel, and are so graduated in their leads as to cause a progressively decreasing speed of movement of the blank carrying head as it moves toward the axis of the stone, and a progressively increasing speed of movement as it is carried toward the periphery in a manner to compensate for the variable speed of the grinding surface on an increasing or decreasing radius.

Figure 5:
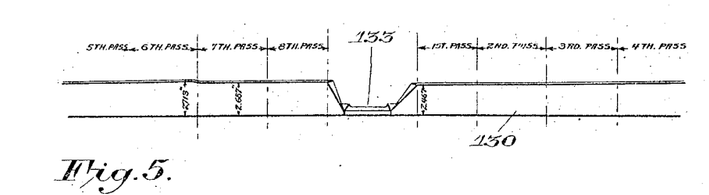
Fig. 5 is a development of a face cam for controlling the movement of the blank carrying head in a step by step manner toward the stone as partly shown in Fig. 3.
Figure 6:
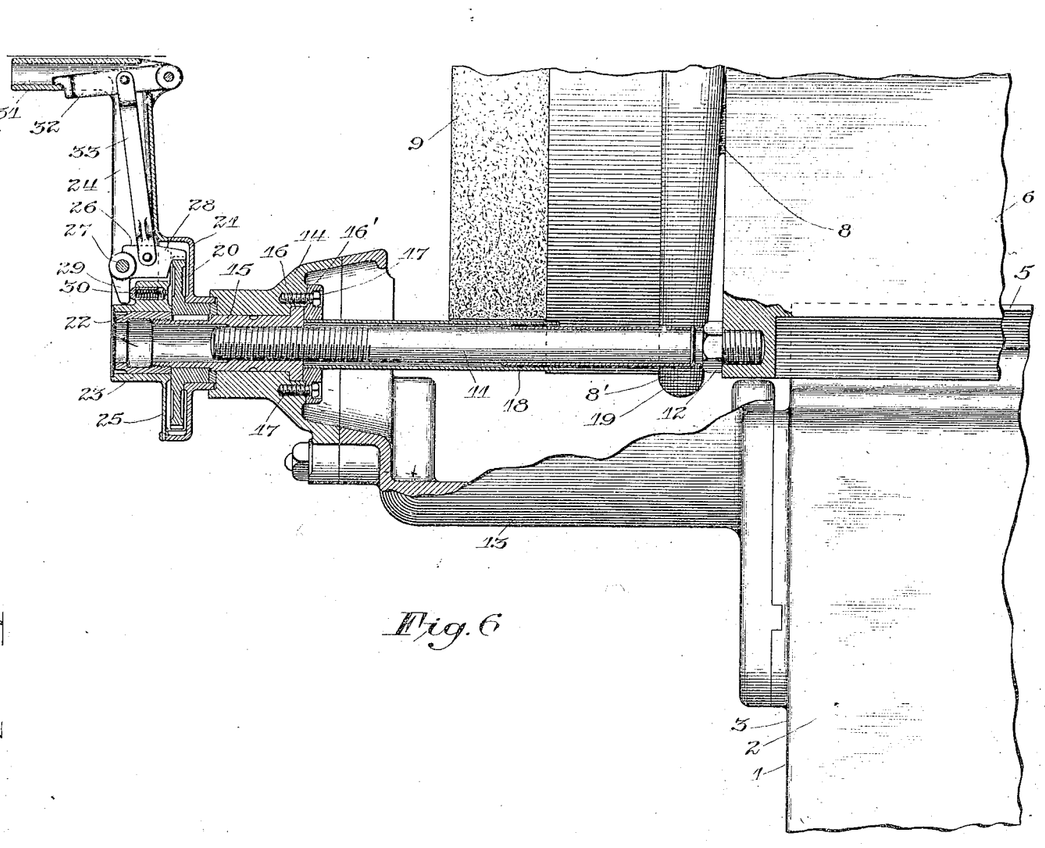
Fig. 6 is a sectional side elevation of the micrometer stone adjusting mechanism.
Figure 7:
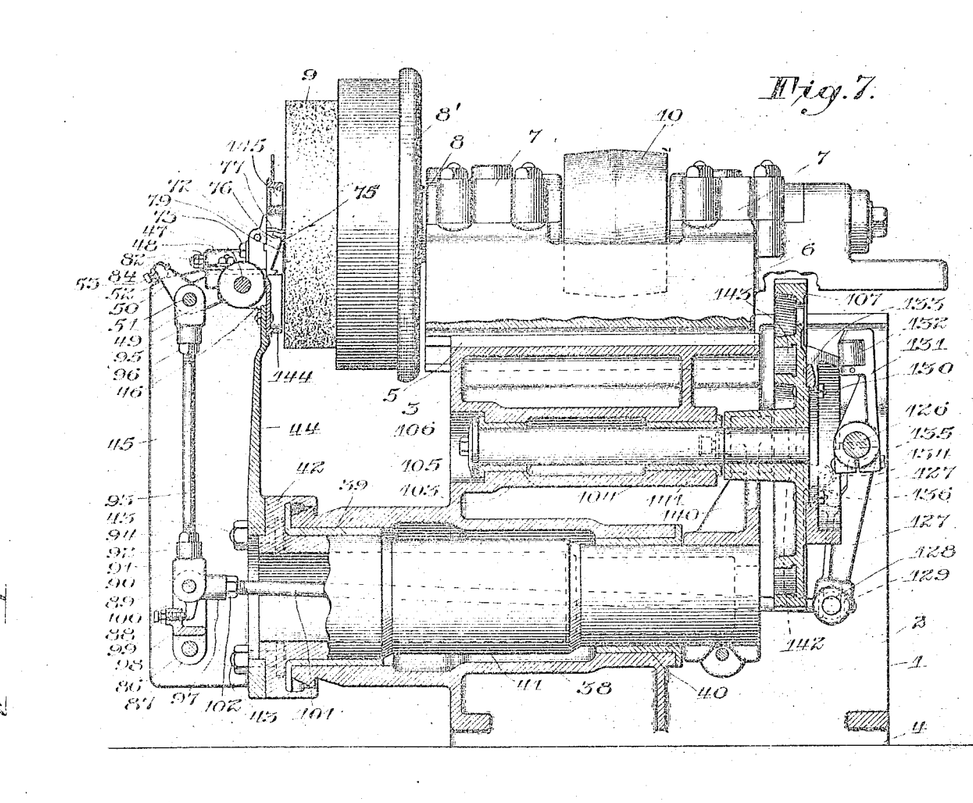
Fig. 7 is a longitudinal sectional elevation of parts of the machine.

The face cam member 130 comprises eight segmental tracks corresponding with the eight leads of the multiple cam, the rise of each segment being progressively proportioned in a manner to cause the blank carrying head to approach the stone in a step by step manner, permitting a more aggressive action of the stone during the passes of the blank carrying head and a gradually reduced action as the travel of the section approaches a finished form having a cutting edge, as shown diagrammatically in the development of the cam, as shown in Fig. 5, where the rise of the segment of the last two passes is slightly reduced to compensate for any yielding of the operative parts of the mechanism, and provides a perfect finish upon each of the sections without undue heating. Any structure, regardless of its massiveness and strength of parts, will yield under strains in its operation, and by reason of the proportionate rise of all the segments of the head controlling cam, I have provided compensatory means that combine efficiency and economy with increased protection.

Figures 8, 9, 14:
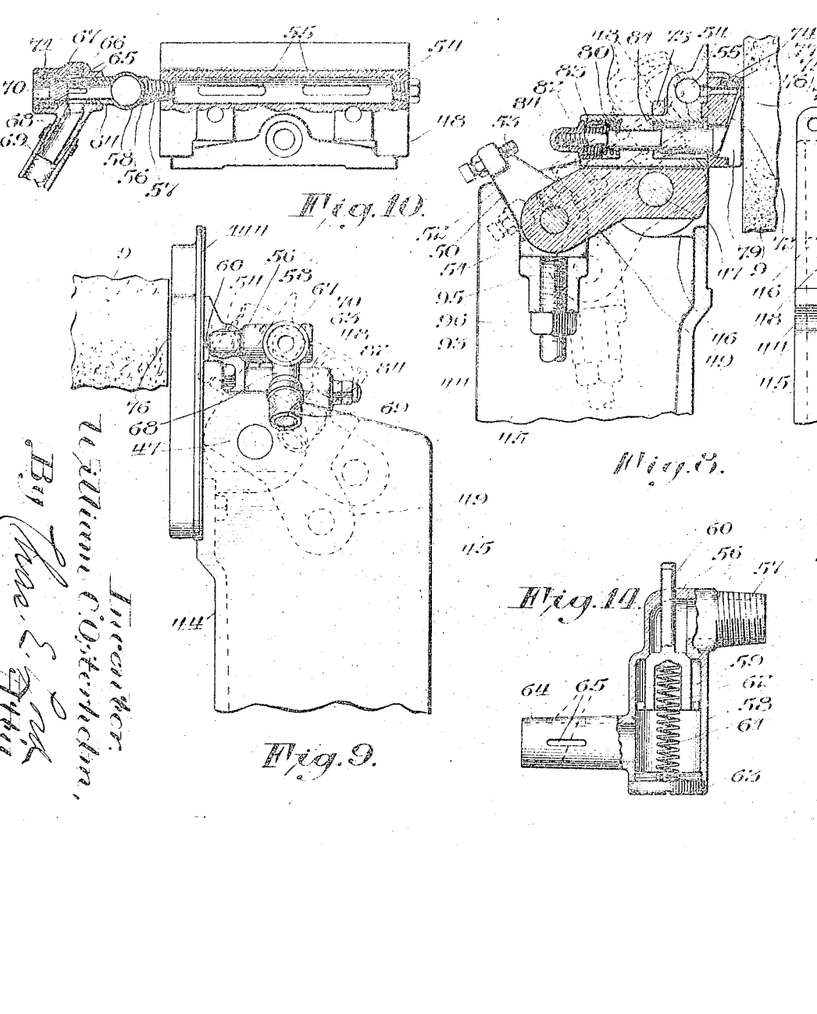
Fig. 8 is a sectional end elevation of a detached detail of part of the machine designed to illustrate the construction and operation of the blank carrying head.
Fig. 9 is a reversed view of Fig. 8.
Fig. 14 is a sectional detail of an automatically controlled valve forming part of the cooling water supply mechanism.

In operation the stone is given a rapid speed of rotation through the driving pulley 10 and is adjusted to a proper grinding position by means of the hand lever 24 and its associated mechanism. The blank carrying head 48 is normally in the position shown by dotted lines in Fig. 8, with the front end of the stud 80 engaging with the contact screw 53 carried by the arms 52 in a manner to open the slidable jaw 79 against the force of the spring 83 to permit the placing of the blanks by the operator. With the head in the position indicated, the valve 59 of the water supply controlling mechanism is closed by means of the spring 61 and no water flows to the head. When the blanks are placed upon the head the operator presses down upon the foot lever 124, thereby releasing the clutch dog 117 from engagement with the clutch shipping lever 118, and the spur gear wheel 107 is rotated through the associated gearing, and the cams 130 and 143, through their operative connections, simultaneously rock the blank carrying head 48 toward and across the face of the stone. As the head is rocked toward the stone, the stem 60 of the valve 59 engages with a fixed shield 144 carried by the arm 44 and opens the valve against the pressure of the spring 61, permitting the water to flow to the chamber 54 and through the outlet ports 55 and openings 74, and it is directed against the backs and over the edges of the blanks against the stone in a manner to surround or immerse the blanks to effectively dissipate the heat generated by the abrasive action of the stone. When the last pass of the arm 44 has been made and the head is receding toward its initial position, the released water, flowing into the grooves 78 in the block 72, prevents the vacuum that otherwise might exist between the block and section blanks, permitting a ready removal thereof by the operator. The rods 93 and 101 being adjustable longitudinally, the throw of the blank carrying head may be accurately regulated. The body of the stud 141 carried by the arm 140 is larger in its diameter than the roller 142 journaled thereon and is releasably secured to the arm in a manner permitting it to be moved forward through the arm sufficient to release the roller from the multiple cam 143, permitting the arm 44 to rock laterally sufficient to carry the blank carrying head 48 beyond the face of the grinding stone when it is desired to substitute a new stone. The shield 144 is provided with an opening 145 through which a bracing tool may be inserted, and 146 represents a detachable hood that surrounds the stone in a manner to direct the cooling water to a trough 147 that empties into a conduit 148.

Having shown and described a preferred embodiment of my invention, I do not desire that it be confined to the precise details of construction, it being understood that changes may be made in the form, proportion, and organization of the associated parts without departing from the spirit of my invention as indicated in the appended claims.

What I claim as my invention, and desire to secure by Letters Patent, is:

1. A grinding machine including an abrasive element, a blank carrying head, means for advancing said head toward or from said abrasive element, and means for supplying cooling water automatically and intermittently to said head.

2. A grinding machine including an abrasive element, a blank carrying member, means for advancing said member toward said abrasive element, and means for automatically supplying cooling water to said member in a controlled intermittent manner.

3. A grinding machine including an abrasive element, a blank carrying member, means for advancing said member toward said abrasive element, and means dependent upon the movement of said member for supplying cooling water thereto.

4. A grinding machine including an abrasive element, a blank carrying member, and cam means for advancing said member step by step toward said abrasive element.

5. A grinding machine including an abrasive element, a blank carrying member, and means whereby a blank may be immersed in water as it is fed toward said abrasive element.

6. A grinding machine including an abrasive element, a blank carrying member, and cam means for advancing said member toward said abrasive element and reciprocating said member transversely with respect to said abrasive element.

7. A grinding machine including an abrasive element, a blank carrying member, means for advancing said member toward said abrasive element and reciprocating said member transversely with respect to said abrasive element, and means for supplying cooling water automatically to said member in a controlled intermittent manner.

8. A grinding machine including an abrasive element, a blank carrying head, means for advancing said head toward or from said abrasive element, means for supplying cooling water to said head, and means whereby the supply of cooling water may be admitted to said head as it approaches the abrasive element and shut off when it recedes therefrom.

9. A grinding machine including an abrasive element, a blank carrying member, means for reciprocating said blank carrying member transversely with respect to said abrasive element, means for advancing step by step said blank carrying member toward said abrasive element, and means for automatically controlling a supply of cooling water to said blank carrying member.

10. A grinding machine including an abrasive element, a blank carrying head, means for moving said head toward or from said abrasive element, and means for supplying cooling water to said head, said means being controlled by said head moving means.

11. A grinding machine including an abrasive element, a blank carrying head, means for moving said head toward or from said abrasive element, a chamber in said head having outlet ports leading toward said abrasive element, and means connecting said chamber with a source of cooling water supply, said means including spring-pressed plunger valve mechanism having its operation controlled by said head moving mechanism.

12. A grinding machine including an abrasive element, a blank carrying head, means for supporting and rocking said head toward or from said abrasive element, a chamber in said head having outlet ports leading toward said abrasive element, a spring-pressed plunger valve communicating with said chamber, and a source of cooling water supply, said valve being opened by engaging with said head supporting means when said head is rocked toward said abrasive element.

13. A grinding machine including an abrasive element, a blank carrying head, means for supporting and moving said head toward or from said abrasive element, and a movable blank clamping jaw coöperating with said head and controlled by a to and fro movement thereof.

14. A grinding machine including an abrasive element, a blank carrying head, means for supporting and moving said head toward or from said abrasive element, and a spring-pressed blank holding jaw coöperating with said head, said jaw being released by engaging with said head moving means.

15. A grinding machine including an abrasive element, an arm adapted to move across the face of said abrasive element, a rocking blank carrying head pivotally mounted upon said arm, means for rocking said head, and a spring-pressed blank holding jaw coöperating with said head, said jaw being released by contact with said head rocking means.

16. A grinding machine including an abrasive element, an arm adapted to move across the face of said abrasive element, a rocking blank carrying head pivotally mounted upon said arm, means for rocking said head, said means including a rockable arm pivotally connected with said head, and a spring-pressed slidable blank holding jaw carried by said head and coöperating therewith, said jaw being released by contact with said rockable arm.

17. A grinding machine including an abrasive element, a blank carrying head provided with grooves upon its face, a chamber in said head having outlet ports communicating with said grooves, a movable blank clamping jaw coöperating with said head, a source of water supply under pressure, and means for simultaneously actuating said clamping jaw and controlling the flow of water to said grooves whereby the flow of water will operate to release the blanks when the movable jaw opens.

18. A grinding machine including a constantly rotatable abrasive element, an arm adapted to vibrate across the face of said abrasive element, a rocking blank carrying head pivotally mounted upon said arm, an intermittently rotatable element having a plurality of cam races operatively connected with said vibratable arm, a face cam element rotatable in unison with said first cam element and divided into segments having a variable rise, and operative connections between said rocking blank carrying head and said face cam.

19. A grinding machine including a constantly rotatable abrasive element, an arm adapted to vibrate across the face of said abrasive element, a rocking blank carrying head pivotally mounted upon said arm, an intermittently rotatable element having a plurality of cam races operatively connected with said vibratable arm, a face cam element rotatable with said first cam and divided into segments having a variable rise, and operative connections between said rocking blank carrying head and said face cam including a toggle mechanism.

20. A grinding machine including, in combination, a main frame, a slidable head adjustable longitudinally upon said frame, a spindle journaled in said head, an abrasive stone carried by said spindle, a rockable longitudinally disposed cylinder journaled in said frame, a vertically disposed arm secured to the front end of said cylinder, a rocking blank carrying head mounted upon the upper end of said arm, a rotatable cam element journaled upon said frame and provided with a plurality of cam races, an arm secured to the opposite end of said cylinder, and a roller carried by the free end of said arm and adapted to travel in said cam races whereby a vibratory movement is imparted to said vertically disposed arm.

21. A grinding machine including, in combination, a main frame, a slidable head adjustable longitudinally upon said frame, a spindle journaled in said head, an abrasive stone carried by said spindle, a rockable longitudinally disposed cylinder journaled in said frame, a vertically disposed arm secured to the front end of said cylinder, a rocking blank carrying head mounted upon the upper end of said arm, a rotatable cam element journaled upon said frame and provided with a plurality of cam races, an arm secured to the opposite end of said cylinder, a roller carried by the free end of said arm and adapted to travel in said cam races whereby a vibratory movement is imparted to said vertically disposed arm, a face cam rotatable with said first cam, a transversely disposed shaft journaled upon said frame, an arm secured to said shaft and having its free end engaging with said face cam, toggle mechanism carried by said vertically disposed arm and operatively connected with said rocking blank carrying head, a second arm secured to said transverse shaft, and a link connection between the free end of said second arm and said toggle mechanism.

22. A grinding machine including, in combination, a main frame, a slidable head adjustable longitudinally upon said frame, a spindle journaled in said head, an abrasive stone carried by said spindle, means for adjusting said head upon said frame including a shaft having one end connected with said head, the opposite end of said shaft being threaded, a sleeve journaled upon the frame and receiving the threaded end of said shaft, a toothed wheel secured to said sleeve, a hand lever movable angularly about the axis of said shaft, detent mechanism carried by said hand lever and adapted to engage with said toothed wheel, and means whereby said hand lever may be given a measured throw.

In testimony whereof I affix my signature.

WILLIAM C. OSTERHOLM.